United States Patent [19]

Saito

[11] Patent Number: 4,641,278
[45] Date of Patent: Feb. 3, 1987

[54] MEMORY DEVICE WITH A REGISTER INTERCHANGE FUNCTION

[75] Inventor: Tomotaka Saito, Yokohama, Japan

[73] Assignee: Kabushiki Kaisha Toshiba, Kawasaki, Japan

[21] Appl. No.: 666,449

[22] Filed: Oct. 30, 1984

[30] Foreign Application Priority Data

Oct. 31, 1983 [JP] Japan .................. 58-203837

[51] Int. Cl.⁴ .......................................... G11C 13/00
[52] U.S. Cl. .......................... 365/78; 364/900; 365/49
[58] Field of Search ............ 365/63, 78, 49, 189, 365/230; 364/900

[56] References Cited

U.S. PATENT DOCUMENTS 4,592,019  5/1986  Huang .................................. 365/78

OTHER PUBLICATIONS

"Z8000 TM CPU Technical Manual," Zilog, Inc., pp. 6-52, Jan. 1983.

Primary Examiner—Terrell W. Fears
Attorney, Agent, or Firm—Finnegan, Henderson, Farabow, Garrett & Dunner

[57] ABSTRACT

A memory device with a register interchange function includes a register file with a plurality of registers, one of which is selected according to select signals, and a register select circuit. The internal memory state of the register select circuit is updated according to the internal memory state and a pair of interchange data for interchanging the select signals. In a register selection mode, a level setting of the select data is performed depending on the internal memory state and the register select data.

6 Claims, 7 Drawing Figures

MEMORY DEVICE WITH A REGISTER INTERCHANGE FUNCTION

BACKGROUND OF THE INVENTION

The present invention relates to improvements in a memory device with a register interchange function for use in a data processor.

In a microprocessor, one of the fundamental operations of data processing is the interchange of data stored in a memory device such as a register.

Figure 1:
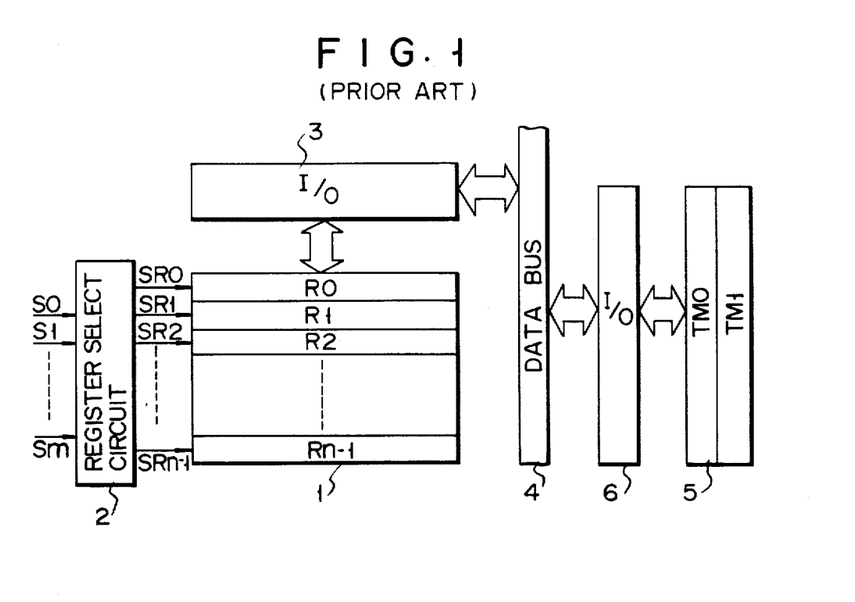
FIG. 1 illustrates in block form a circuit configuration of a conventional memory device.

A basic arrangement of a conventional memory device configuration requiring such data interchange is shown in FIG. 1.

In FIG. 1, reference numeral 1 designates a register file comprising n registers R0–Rn−1. One of the registers R in the register file 1 is selected by a register select circuit 2. Select data Sj (j=0, 1, 2, ... m) of (m+1) bits is stored in the register select circuit 2. A combination of the select data Sj, or the bit information, selects one of the select signals SRi (i=0, 1, 2, ..., n−1). Then, the select signal SRi specifies a corresponding register Ri.

An input/output (I/O) control unit 3 controls data input and output to and from the selected register R. The I/O control unit 3 is connected to a data bus 4 for providing a common path to transfer various types of data.

A temporary register file 5 comprises a couple of temporary registers TM0 and TM1. An input/output control unit 6, provided between the temporary register file 5 and the data bus 4, is for the temporary register file 5.

In the above memory device, data is interchanged between the register R1 and Rn−1, for example, in the following way. To start, the register R1 is selected by the register select circuit 2, and the contents of the register R1 are temporarily stored in the register TM0 in the temporary register file 5 through the I/O unit 3, the data bus 4 and the I/O unit 6. Similarly, the register Rn−1 is selected and the contents thereof are temporarily stored in the register TM1 in the temporary register file 5. Then, through the same path in the reverse direction, i.e., the I/O unit 6, the data bus 4 and the I/O unit 3, the contents in the register TM1 are loaded into the register R1. Finally, the register TM0 is selected, and the contents thereof are loaded into the register Rn−1. The above operations are summarized in the following.

R1→TM0

Rn−1→TM1

TM1→R1

TM0→Rn−1

In a system including an accumulator, either of the temporary registers TM0 and TM1 may also serve as an accumulator.

As described above, the conventional memory device requires two extra registers for data interchange, in addition to the register file. Further, the conventional memory device requires at least four operations for transferring data between the registers. As a result, the memory device has a complicated circuit arrangement, and the data interchange takes a long time.

SUMMARY OF THE INVENTION

Accordingly, an object of the present invention is to provide a memory device with a register interchange function which is capable of interchanging data between registers at a high speed, and requiring no additional registers.

According to the present invention, there is provided a memory device with a register interchange function, comprising a register file with a plurality of registers, any one of which is selected according to select signals, and a register select circuit. The register select curcuit has a register select mode and a select signal interchange mode. During the register select mode, the register select circuit receives register select data and select signals are set at proper levels depending on the contents of the internal memory states of the registers and the select data is supplied. In the interchange mode, the register select circuit receives interchange data and the internal memory states thereof are updated depending on the internal memory states and the interchange data. The data interchange between registers is then achieved by interchanging the select signals of the respective registers.

DETAILED DESCRIPTION OF THE PREFERRED EMBODIMENT

An embodiment of a memory device with a register interchange function according to the present invention will be described referring to the accompanying drawings.

Figure 2:
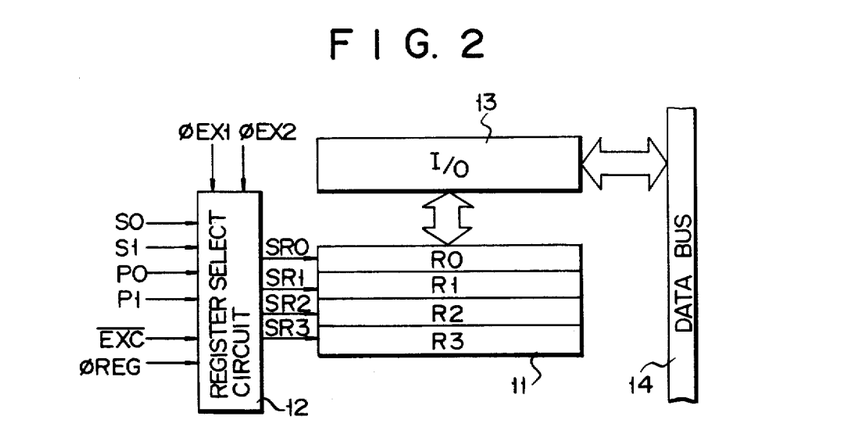
FIG. 2 illustrates in block form a circuit configuration of a memory device with a register interchange function according to the present invention.

In FIG. 2, a register file 11 contains four registers R0–R3, for example. A register select circuit 12 selects only one of the registers in register file 11. The register select circuit 12 has two operation modes, one of which is for selecting a necessary register, and the other is for interchanging select signals used for the register selection operation. In the register select mode, a timing pulse $\phi REG$ of logical "1" for designating register selection and select data of two bits S0 and S1 are applied to the register select circuit 12. On the basis of the logical level of the select data S0 and S1 and the data previously stored in the register select circuit 12, the register select circuit 12 sets one of the select signals SR0–SR3 at a logical "1" state.

In the interchange mode of the select signals, a timing pulse $\overline{EXC}$ of logical "0" for select signal interchange, two types of timing pulses $\phi EX1$ and $\phi EX2$, and interchange data of two bits (S0, S1) are applied to the register select circuit 12. In the interchange mode, the register select circuit 12 responds to the previously stored data therein and the interchange data (S0, S1) and (P0, P1) of two bits, and updates the internal data for generating the select signals SR0–SR3.

Reference numeral 13 designates an I/O unit for controlling data write and data read out to and from one of the registers as selected by the register select circuit 12. The I/O unit 13 is connected to a data bus 14 through which various types of data pass. Although not shown, ALU (arithmetic and logic unit) and other circuits are further connected to the data bus 14. Data are transferred through the data bus 14 among the ALU, another I/O unit, and the register file 11.

Figure 3:
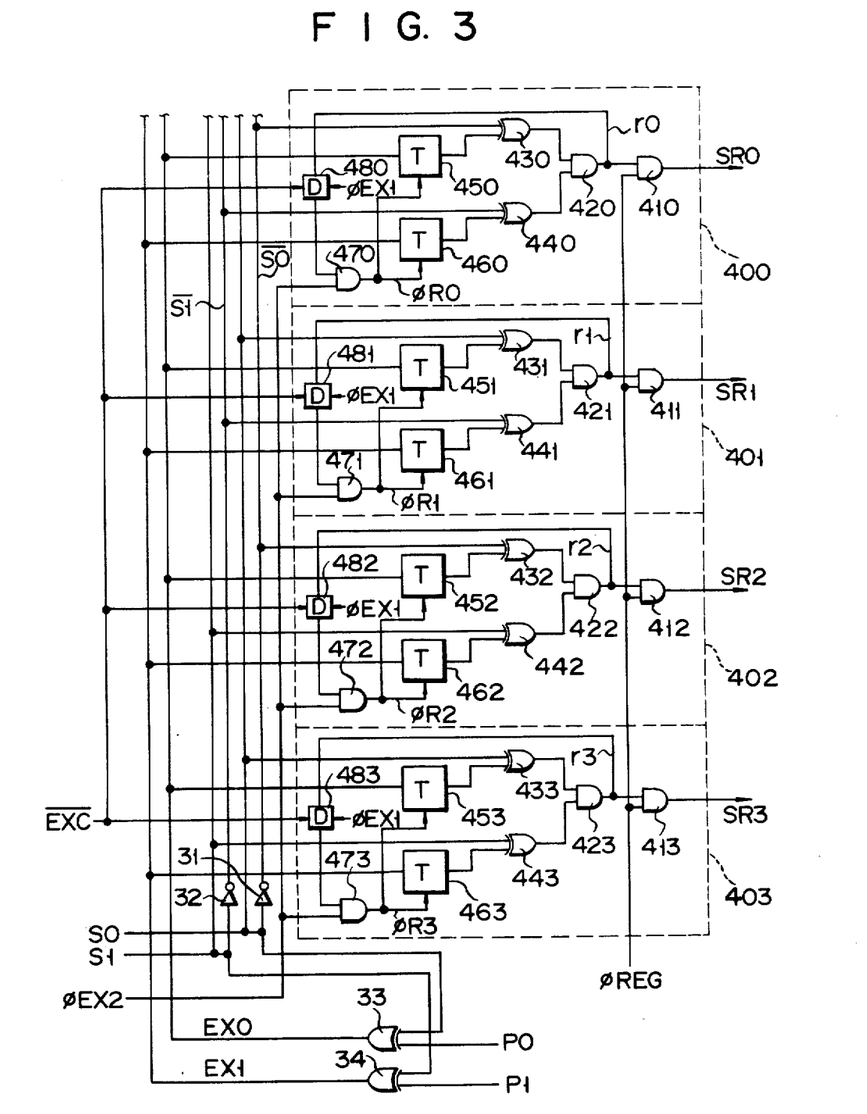
FIG. 3 is a circuit diagram illustrating details of a part of the memory device of FIG. 2.

Turning now to FIG. 3, there is shown a circuit arrangement of the register select circuit 12 used in the FIG. 2 circuit. The select or interchange data S0 and S1 of two bits are respectively connected to input terminals of inverters 31 and 32, and to input terminals of exclusive OR gates 33 and 34. The interchange data P0 and P1 of two bits are supplied to the other input terminals of exclusive OR gates 33 and 34, respectively.

Level setting circuits 400–403 set levels of the select signals SR0–SR3, respectively. The operation of the level setting circuit 400 for setting the level of select signal SR0 is described below.

In the level setting circuit 400 an AND gate 410 with two inputs produces select signal SR0. The AND gate 410 is connected at one input terminal to the output signal r0 from an AND gate 420, while at the other input terminal to a timing pulse $\phi$REG. The AND gate 420 also has two inputs and is connected at the two input terminals to the output signals of two exclusive OR gates 430 and 440, respectively. Applied to the exclusive OR gate 430 are an inverted data $\overline{S0}$ of the data S0 as the output signal of the inverter 31 and the output signal from a T-type flip-flop circuit 450. Applied to the exclusive OR gate 440 are the inverted data $\overline{S1}$ of the data S1 as the output signal from the inverter 32 and the output signal from a T-type flip-flop circuit 460. The flip-flop circuits 450 and 460 are operable responsive to a clock pulse $\phi$R0 outputted signal from the AND gate 470 when it is logical "1". Each of these flip-flop circuits 450 and 460 keeps the previous level of its output when the input signals thereto are logical "0". It inverts its logical output state when the input signals thereto are logical "1". The output signal EX0 of the exclusive OR gate 33 is supplied as an input signal to the flip-flop circuit 450. The output signal EX1 of the exclusive OR gate 34 is supplied as an input signal to the flip-flop circuit 460. The output signal of a D-type flip-flop circuit 480 with a reset function, which is of the set prior type, and the timing pulse $\phi$EX2 are applied to the AND gate 470. The output signal r0 of the AND gate 420 is applied as an input signal to the D-type flip-flop circuit 480. The timing pulse $\overline{EXC}$ is applied thereto as a reset signal. The timing pulse $\phi$EX1 is applied as a clock pulse to the D-type flip-flop circuit 480. If the input signal to the flip-flop circuit 480 is logical "1" even one time when the timing pulse $\phi$EX1 is logical "1", the D-type flip-flop circuit 480 subsequently holds the output signal at logical "1". In the other logical state of the input signal, the D-type flip-flop circuit 480 holds its output signal at logical "0". The D-type flip-flop circuit 480 is always in a reset state when the timing pulse $\overline{EXC}$ is logical "1". In a reset state, the output signal thereof is logical "0".

The level setting circuits other than the level setting circuit 400 are each configured similar to that of the level setting circuit 400. In those remaining circuits, like portions are designated by numerals of three digits in which the digits except the least significant digits are the same as the corresponding ones used in the level setting circuit 400. A difference of the level setting circuit 401 for setting a level of the select signal SR1 from the level setting circuit 400 as mentioned above is that the data S0 in place of the inverted data $\overline{S0}$ is coupled with an exclusive OR gate 431.

A level setting circuit 402 for setting a level of the select signal SR2 is different from the level setting circuit 400 in that the data S1, not the inverted data S1, is applied to an exclusive OR gate 442.

A level setting circuit 403 for setting a level of the select signal SR3 is different from the level setting circuit 400 in that the data S0, not the inverted data $\overline{S0}$, is applied to an exclusive OR gate 433, and that the data S1, not the inverted data S1, is coupled with an exclusive OR gate 443.

The operation of the register select circuit 12 will now be explained.

In an initial state, i.e., when no pulse and no data are applied to the circuit after power is turned on, the T-type flip-flop circuits 450–453, and 460–463 are all reset to logical "0" in FIG. 3.

In this condition, for selecting one of the registers in the register file 11, the select data (S0, S1) is set in logical "0 0", and a timing pulse $\phi$REG is supplied to the register select circuit 12. The inverted data $\overline{S0}$ and S1 are set to logical "1" by the two inverters 31 and 32, respectively. The output signals from the T-type flip-flop circuits 450 and 460 in the level setting circuit 400 are already logical "0", and the inverted data $\overline{S0}$ and S1, logical "1". The output signals from the exclusive OR gates 430 and 440 in the circuit 400 are therefore both set in logical "1". As a result, the output signal r0 from the AND gate 420 goes to logical "1". At this time, in the remaining level setting circuits 401–403, either or both of each paired exclusive OR gates is set in logical "0". Then, the output signals r1–r3 of the AND gates 421, 422 and 423 are all reset in logical "0".

Accordingly, when the timing pulse $\phi$REG is set to logical "1", only the output signal SR0 from the AND gate 410 in the level setting circuit 400 is set to logical "1", so that register R0 in the register file 11 is selected.

On the other hand, if the select data S0 is set to logical "1", while the select data S1 is set in logical "0", the output signal r1 of the AND gate 421 in the level setting circuit 401 is logical "1". When the timing pulse $\phi$REG is logical "1", only the output signal SR1 of the AND gate 411 in the level setting circuit 401 is logical "1".

When the data S0 is logical "0", and the data S1 is logical "1", only the output signal r2 of the AND gate 422 in the level setting circuit 402 is logical "1". When the timing pulse $\phi$REG is logical "1", only the output signal SR2 of the AND gate 412 in the circuit level setting circuit 402 is logical "1".

In case the data S0 is logical "1", and the data S1 is logical "1", only the output signal r3 of the AND gate 423 in the level setting circuit 403 is logical "1". In this condition, if the timing pulse $\phi$REG is placed in logical "1", only the output signal SR3 of the AND gate 413 in the level setting circuit 403 takes a logical state of "1".

In the initial state, the relationship between the logical states of the two data bits (S0, S1) and the registers selected in the register file 11 is tabulated below.

TABLE 1

| Select Data | | Selected Register |
|---|---|---|
| S0 | S1 | |
| 0 | 0 | R0 |
| 1 | 0 | R1 |
| 0 | 1 | R2 |
| 1 | 1 | R3 |

Then, under control of the I/O unit 13, data are loaded into or read out from the register R selected by the select data (S0, S1).

Figure 4:
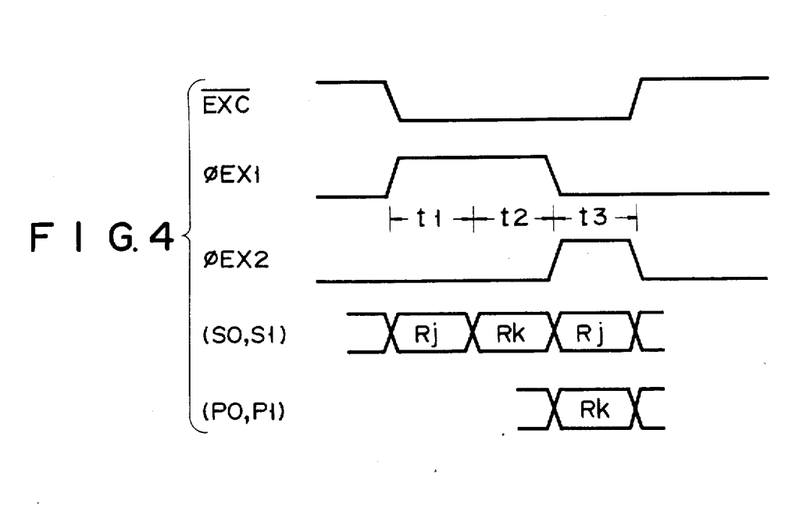
FIG. 4 shows a timing chart useful in explaining the operation of the memory device of FIG. 2.

The operation of the register select circuit 12, when data are interchanged between the two registers, will now be described. The register select circuit 12 performs the data interchange according to the timing as shown in the timing chart as shown in FIG. 4.

During the interchange mode, the timing pulse $\overline{EXC}$ is placed at logical "0". The timing pulse $\phi EX1$ takes a logical "1" over periods t1 and t2. During period t3 following the period t2, the timing pulse $\phi EX2$ is logical "1". During the period t1, the select data (S0, S1) applied to the register select circuit 12 is the interchange information corresponding to the register Rj (j=0, 1, 2, 3), which is one of the registers under data interchange. During the period t2, the select data (S0, S1) is the interchange information corresponding to the register Rk (k=0, 1, 2, 3), which is the other register under data interchange. During the period t3, the select data (S0, S1) is the interchange information corresponding to the register Rj. Further, during this period t3, the interchange information corresponding to the register Rk is applied as the select data (P0, P1) to the register Rk.

An actual data interchange between the registers R0 and R1 will be described. For the purpose of explaining this operation, the register Rj corresponds to R0 and the register Rk, to R1. The select data (S0, S1) corresponding to the contents of the register R0 are (0, 0). The select data (S0, S1) or (P0, P1) corresponding to the contents in the register R0 are (1, 0). As a first step, the timing pulse $\overline{EXC}$ is set to logical "0". Then, the D-type flip-flop circuits 480–483 in the level setting circuits 400–403 are released from a reset state. After the reset state is removed, the timing pulse $\phi EX1$ goes to logical "1", so that the flip-flop circuits 480–483 fetch the input signals, respectively. As stated above, during the period t1 that the timing pulse $\phi EX1$ is logical "1", the select data (S0, S1) is "0 0". During this period, only the output signal r0 of the AND gate 420 is logical "1", while the remaining r1, r2, and r3 are logical "0". Accordingly, in this case, only the output signal of the D-type flip-flop circuit 480 in the level setting circuit 400 is placed at logical "1".

During the period t2 that the pulse $\phi EX1$ is logical "1", the select data (S0, S1) is "1 0". During this period, only the output signal r1 of the AND gate 421 is logical "1", while the remaining output signals r0, r2, r3 are logical "0". Accordingly, in this case, only the output signal of the D-type flip-flop circuit 481 in the level setting circuit 401 is set at logical "1". After the periods t1 and t2, the output signals of the D-type flip-flop circuits 480 and 481 in the level setting circuits 400 and 401 are both placed at logical "1", while the output signals from the D-type flip-flop circuits 482 and 483 in the remaining level setting circuits 402 and 403 are both set at logical "0". At this time, the AND gates 470 and 471 in the two level setting circuits 400 and 401 are enabled. Under this condition, during the next period t3, if the timing pulse $\phi EX2$ at logical "1" is supplied, the AND gates 470 and 471 produce pulses $\phi R0$ and $\phi R1$ at logical "1", respectively. Then, the T-type flip-flop circuits 450 and 451, and 460 and 461 in the two level setting circuits 400 and 401 are ready for operation. During this period t3, "0 0" has been supplied as the select data (S0, S1) to the register select circuit 12, while "1 0", as the other select data (P0, P1). The output signal EX0 of the exclusive OR gate 33 is logical "1", and the output signal EX1 of the exclusive OR gate 34 is logical "0". Accordingly, of those T-type flip-flop circuits 450 and 451 and 460 and 461, only the flip-flop circuits 450 and 451 are inverted in their state, and provide logical "1" signals, respectively.

Then, the timing pulse $\overline{EXC}$ is returned to logical "1". Upon changing of the logical state of the pulse, the two D-type flip-flop circuits 480 and 481, of which the output signals have been logical "1", are reset and take logical "0" output signals, respectively.

At this time, the output signal of the T-type flip-flop circuit 450 in the level setting circuit 400 changes its logical state from "0" to "1". The output signal of the other T-type flip-flop circuit 451 in the level setting circuit 401 also changes its logical state from "0" to "1".

Under this condition, the select data (S0, S1) in logical "0" are supplied to the register select circuit 12, together with the timing pulse $\phi REG$. At this time, the output signal of the T-type flip-flop circuit 451 in the level setting circuit 401 is preset to logical "1". The output signal of the other T-type flip-flop circuit 461 is likewise set to logical "0". Further, the select data S0 is logical "0", and the inverted data S1 is inverted to logical "1". The output signals of the exclusive OR gates 431, 441 are set to logical "1", and the output signal r1 of the AND gate 421 is set to logical "1". In the remaining level setting circuits 400, 402 and 404, either or both of the two exclusive OR gates produces logical "0" signal. Accordingly, the output signals r0, r2 and r3 of the AND gates 420, 422 and 423 are all logical "0". Accordingly, in this case, when the timing pulse $\phi REG$ is logical "1", the select signal SR1 alone is logical "1", thereby selecting the register R1 in the register file 11.

If "1 0" is supplied as the select data (S0, S1) to the register select circuit 12, the output signal of the exclusive OR gate 430 is logical "1", because the inverted data $\overline{S0}$ is logical "0" and the output signal of the T-type flip-flop circuit 450 in the level setting circuit 400 is logical "1". Further, the inverted data $\overline{S1}$ is logical "1", and the output signal from the T-type flip-flop circuit 460 in the level setting circuit 400 is logical "0". Therefore, the output signal of the exclusive OR gate 440 is also logical "1". As a result, the output signal r0 of the AND gate 420 to which the output signals of both the exclusive OR gates 430, 440 are applied, is placed at logical "1". At this time, in the remaining level setting circuits 401, 402 and 403, either or both of the exclusive OR gates is logical "0". Therefore, the output signals r1–r3 of the AND gates 421–423 are all logical "0". As a result, only the select signal SR0 is logical "1" when the timing pulse $\phi REG$ is logical "1", thereby selecting the register R0 in the register file 11.

The T-type flip-flop circuit in each of the level setting circuits 402 and 403 has been in its initial state until now. In the level setting circuit 402, the select signal SR2 is logical "0" only when the select data (S0, S1) is "0 1". In the other level setting circuit 403, the select signal SR3 is logical "1" only when the select signal (S0, S1) is "1 1".

After the states of the T-type flip-flop circuit are updated, the two-bit select data (S0, S1) and the registers of the register file 11 to be selected by the former are related as follows.

TABLE 2

| Select Data | | Selected Register |
|---|---|---|
| S0 | S1 | |
| 0 | 0 | R1 |
| 1 | 0 | R0 |
| 0 | 1 | R2 |
| 1 | 1 | R3 |

As seen from Tables 1 and 2, if "0 0", which was the select data (S0, S1) for selecting the register R0 before the T-type flip-flop circuit is updated, is supplied to the register select circuit 12 after the updating, the register R1 is selected unlike the case before the updating. Further, if "1 0", which was the select data to select the register R1 before the T-type flip-flop circuits are updated, is applied to the register select circuit 12 after the updating, the register R0 is selected unlike the case before the updating. In this way, the select data are interchanged between the registers R0 and R1. The data interchange between the register R0 and R1 is realized by interchanging the select signals SR0 and SR1 associated therewith.

Let us consider a case where the data interchange between the registers R1 and R3 is executed when the T-type flip-flop circuits 450 and 451 are updated and their output signals are both logical "1". In this case, "1 0" is supplied as the interchange data (S0, S1) to the register select circuit 12 during the period t1 in FIG. 4. At this time, the inverted data $\overline{S0}$ has been inverted by the inverter 31 to be logical "0". Further, the output signal of the T-type flip-flop circuit 450 in the level setting circuit 400 has been set at logical "1". Therefore, the output signal of the exclusive OR gate 430 is caused to be logical "1". Further, the inverted data S1 is logical "1", and the output signal of the T-type flip-flop circuit 460 in the level setting circuit 400 is previously set at logical "0". Then, the output signal of the exclusive OR gate 440 is also logical "1". As a result, the output signal r0 of the AND gate 420 is logical "1". Accordingly, if, after each D-type flip-flop circuit is released from the reset state, the timing pulse $\phi$EX1 is logical "1", the output signal of the D-type flip-flop circuit 480 in the level setting circuit 400 is set at logical "1". During the next period t2, "1 1" is applied as the interchange data (S0, S1) to the register select circuit 12. At this time, in the level setting circuit 403, the two exclusive OR gates 433 and 443 are both logical "1". Additionally, the output signal r3 of the AND gate 423 to which those signals are applied, is also logical "1". Accordingly, during this period, the output signal of the D-type flip-flop circuit 483 is set at logical "1". After the period t2, the two AND gates 470 and 473 are enabled. Then, when the timing pulse $\phi$EX2 is supplied during the period t3, the clock pulses $\phi$R0 and $\phi$R3 are set at logical "1", so that the T-type flip-flop circuits 450 and 453, and 460 and 463 in the two level setting circuits 400 and 403 are ready for operation. During this period t3, one of the select data (S0, S1) as supplied is "1 0", and the other (P0, P1) is "1 1". At this time, the output signal EX0 of the exclusive OR gate 33 is logical "0", and the output signal EX1 of the exclusive OR gate 34 is logical "1". For this reason, of the T-type flip-flop circuits 450 and 453, and 460 and 463, only the T-type flip-flop circuits 460 and 463 to which the output signal EX1 of the exclusive OR gate 34, as set at logical "1", is supplied, have inverted the logical states at the outputs. At this time, the output signals of the T-type flip-flop circuits 460 and 463 were both logical "0". Therefore, when the clock pulses $\phi$R0 and $\phi$R3 are set at logical "1", the output signals of the flip-flop circuits 460 and 463 are both set at logical "1". Accordingly, after the period t3, the output signal of the T-type flip-flop circuit 460 in the level setting circuit 400 is changed in logical state from logical "0" to logical "1". The output signal of the T-type flip-flop circuit 463 in the level setting circuit 403 is also changed in logical state from "0" to "1". Thus, the output signals of the T-type flip-flop circuits 450, 451, 452, and 453 are "1", "1", "0", and "0", respectively. The T-type flip-flop circuits 460, 461, 462 and 463 are "1", "0", "0" and "1", respectively.

In this condition, the select data (S0, S1) in logical "0" and a timing pulse $\phi$REG are connected to the register select circuit 12. At this time, the output signal of the T-type flip-flop circuit 451 in the level setting circuit 401 is set at logical "1", while the output signal of the T-type flip-flop circuit 461 is set at logical "0". Further, the select data S0 is logical "0", while the inverted data S1 is logical "1". Therefore, the output signals of the exclusive OR gates 431 and 441 are both logical "1", so that the output signal r1 of the AND gate 421 is set at logical "1". In the level setting circuits 400, 402 and 403, the output signals of the AND gates 420, 422 and 423 r0, r2 and r3 are set at logical "0" as in the above case. Accordingly, in this case, only the select signal SR1 is logical "1", thereby selecting the register R1.

Then, "1 0" is connected as the select data (S0, S1) to the register select circuit 12. In this case, the select data S0 is logical "1", and the output signal of the T-type flip-flop circuit 453 in the level setting circuit 403 is logical "0". Accordingly, the output signal of the exclusive OR gate 433 is caused to be logical "1". Further, the select data S1 is logical "0", and the output signal of the T-type flip-flop circuit 463 is logical "1". Therefore, the output signal of the exclusive OR gate 443 is also caused r3 to be logical "1". As a result, the output signal of the AND gate 423 to which the output signals of the exclusive OR gates 433 and 443 are supplied, is set at logical "1". Accordingly, in this case, the register R3 is selected.

The T-type flip-flop circuits 452 and 462 in the level setting circuit 402 remain in their initial states. Therefore, if "0 1" is supplied as the select data (S0, S1) to the register select circuit 12, the select signal SR2 is placed in logical "1", thereby selecting the register R2.

Then, "1 1" is supplied as the select data (S0, S1) to the register select circuit 12. The inverter 31 provides the inverted data $\overline{S0}$ of logical "0". The output signal of the T-type flip-flop circuit 450 in the level setting circuit 400 has been logical "1". In this condition, the exclusive OR gate 430 provides logical "1". Further, the inverter 32 provides inverted data S1 of logical "0". The exclusive OR gate 440 also provides an output signal of logical "1", since the output signal of the T-type flip-flop circuit 460 has been logical "1". As a result, the AND gate 420 to which the output signals of the exclusive OR gates 430 and 440 are coupled, produces an output signal r0 of logical "1". Accordingly, in this case, the register R0 is selected. The select data (S0, S1) of two bits, externally supplied after the output states of the T-type flip-flop circuits are changed, selects the registers in the register file 11 as shown in Table 3.

TABLE 3

| Select Data | | Selected Register |
|---|---|---|
| S0 | S1 | |
| 0 | 0 | R1 |
| 1 | 0 | R3 |
| 0 | 1 | R2 |
| 1 | 1 | R0 |

As seen from Table 3, the data interchange between the register R0 (which has been changed to the register R1) and the register R3 is performed by interchanging the select signals SR1 and SR3.

Thus, at the time of the register selection, data are interchanged between substantially arbitrary registers in such a manner that the memory states in each T-type flip-flop circuit is updated depending on the interchange data (S0, S1) and (P0, P1) corresponding to a pair of registers subjected to data interchange and to the memory state of each T-type flip-flop circuit.

As may be recalled, the coventional memory device requires at least two temporary registers for data interchange, and four times of data transfers between the registers during the data interchange. On the other hand, as described above, the memory device of the present invention does not require temporary registers or the like for data interchange, nor is there a data transfer operation of the stored data in the registers. Therefore, data interchange is very fast.

When the register file is formed of a static RAM, it is common practice that the data lines (bit lines) are precharged. Because of this feature, at least two clock cycles are required for reading out data from the register for data interchange, one clock cycle for specifying a word line in the RAM, and the other clock cycle for reading out data stored in memory cells connected to a word line as specified and for loading the read out data into a temporary register. On the other hand, in the present invention, if each of the periods t1–t3 shown in FIG. 4 is set to the half period in the clock cycle of the RAM, i.e., 0.5 clock period, only 1.5 clock period is required for the data interchange. In interchanging the data between two registers, the operating speed is improved four times or more, compared to the conventional type. If the memory device according to the present invention is applied to a data processing system with a memory device for storing data with a plurality of digits, such as desk-top calculators and small electronic game machines, the data transfer between the registers can be performed during a time period of only 1.5 clock cycles, while the conventional memory device requires (number of digits×4) operations of data transfer. Thus, the data processing time is remarkably improved.

Figure 5:
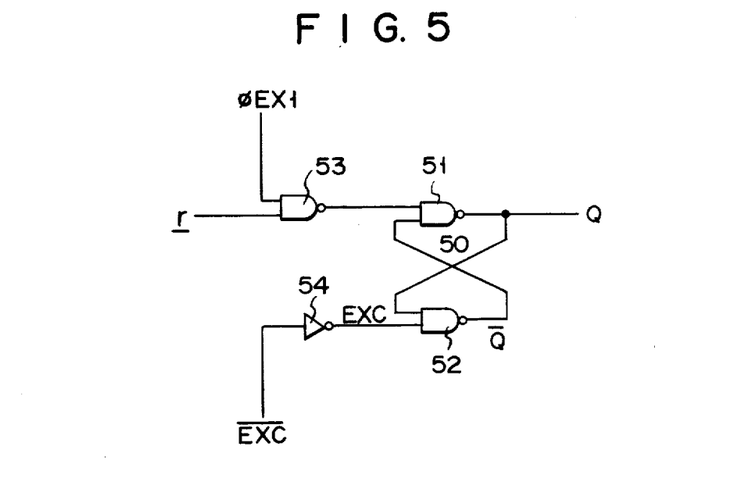
FIG. 5 is a circuit arrangement illustrating details of another part of the embodiment of FIG. 2.

FIG. 5 shows a circuit arrangement of each of the D-type flip-flop circuits 480–483 used in the circuit of FIG. 3. As shown, the D-type flip-flop circuit comprises a pair of NAND gates 51 and 52 constituting a flip-flop 50, a NAND gate 53, and an inverter 54. The NAND gates 51 and 52 are cross coupled in such a manner that one of the input terminals of the NAND gate 51 is connected to the output terminal of the NAND gate 52, and vice versa. The NAND gate 53 is coupled with a timing pulse φEX1 and the output signal r of the corresponding AND gate of those 420–423. The inverter 54 is coupled with the timing pulse $\overline{EXC}$. The output signal of the NAND gate 53 is connected to the NAND gate 51. The output signal of the inverter 54 is connected to the NAND gate 52.

In the D-type flip-flop circuit thus arranged, when the output signal EXC of the inverter 54 is logical "0", the $\overline{Q}$ output signal of the flip-flop 50 is logical "1". At this time, the timing signal φEX1 is logical "0" and the output signal of the NAND gate 53 is logical "1". Accordingly, the output signal Q of the flip-flop 50 is logical "0". Under this condition, the output signal EXC of the inverter 54 is then logical "1". If the signal r keeps logical "0" during the period that the timing pulse φEX1 is logical "1", the Q output signal is kept at logical "0". On the other hand, if the signal r remains at logical "1" during the period that the timing pulse φEX1 is logical "1", the output signal of the NAND gate 53 will be logical "0". The Q output signal of the flip-flop 50 is inverted to be logical "1". This logical "1" state is maintained after the signal r and the timing pulse φEX1 are returned in logical state to logical "0". Thus, in this flip-flop circuit, if the signal r is once logical "1" during the logical "0" period of the timing pulse EXC, the Q output signal holds its logical state at logical "1", subsequently.

Figure 6:
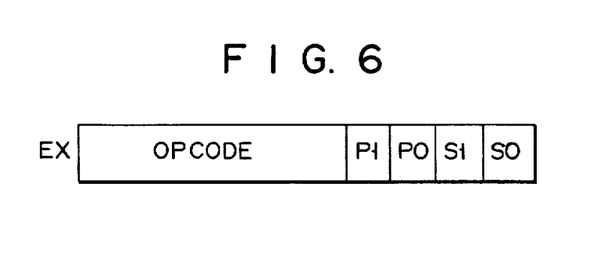
FIG. 6 shows a format of a command for obtaining a pair of interchange data used in the memory device of FIG. 2.

FIG. 6 shows a format of an instruction for generating by a CPU or the like a pair of interchange data (S0, S1) or (P0, P1) to be applied to the register select circuit 12 at the time of register interchange.

Figure 7:
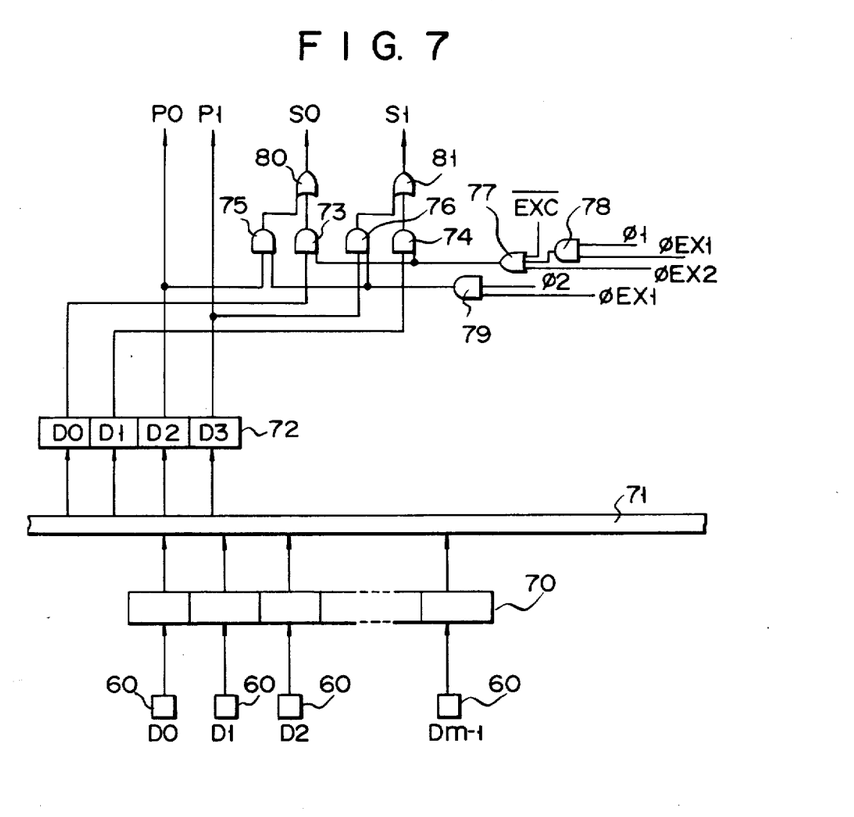
FIG. 7 illustrates an arrangement of a circuit for obtaining a pair of interchange data using the above command.

FIG. 7 shows a circuit arrangement for generating the pair of interchange data (S0, S1) or (P0, P1) using this instruction. In the figure, 60, 60, ... designates pins of an IC package, through which various digital data including data D0–D3 for preparing the data S0, S1, P0, and P1 are externally applied to the IC package. The data applied are temporarily stored in a data input buffer 70. The data is then read out from the buffer 70 into an internal data bus 71. Of the data on the data bus 71, the data D0–D3 are loaded into a TM register 72 at an appropriate time. The data D0 is loaded into an AND gate 73. The data D1 is loaded into an AND gate 74. The data D2 is connected as the data P0 to the register select circuit 12, and also to an AND gate 75. The data D3 is supplied as the data P1 to the register select circuit 12 and to an AND gate 76. The output signal of an OR gate 77 is connected to the AND gates 73 and 74. The OR gate 77 receives the output signal of an AND gate 78, the timing pulse φEX2 and the timing pulse $\overline{EXC}$. The AND gate 78 receives the pulse φEX1 and a pulse φ1 with a pulse width corresponding to the period t1 in FIG. 4.

The timing pulse $\overline{EXC}$ is usually generated by an instruction decoder (not shown) using a part of the OPCODE in the instruction shown in FIG. 6, and takes a logical "0" at the time of data interchange.

The output signal of an AND gate 79 is applied to the AND gates 75 and 76. The pulse φEX1 and a pulse φ2 with a pulse width corresponding to the period t2 in FIG. 4 are supplied to the AND gate 79. The output signals of the AND gates 75 and 73 are applied to an OR gate 80. The outputs of the AND gates 76 and 74 is connected to an OR gate 81. The output of the OR gate 80 is connected as the data S0 to the register select circuit 12. The output signal of an OR gate 81 is supplied as the data S1 to the register select circuit 12.

With such an arrangement, during the period t2 that the pulse φEX1 is logical "1" and the pulse φ2 is logical "1", the output signal of the AND gate 79 is logical "1" to enable the AND gates 75 and 76. As a result, the data D2 and D3, or P0 and P1, are output as the interchange data S0 and S1 through the AND gates 75 and 76, and the OR gates 80 and 81. During the period t1 that the pulse $\phi EX1$ is logical "1" and the pulse $\phi 1$ is logical "1", and during the period t3 that the pulse $\phi EX2$ is logical "1", the output signal of the OR gate 77 is logical "1" to enable the AND gates 73 and 74. As a result, the data D0 and D1 are output as the interchange data S0 and S1, respectively through the AND gates 73 and 74, and the OR gates 80 and 81.

In the select operation of the register, i.e., in reading and writing data, the output signal of the OR gate 77 is logical "1", since timing pulse $\overline{EXC}$="1". The register data D0 and D1 are output, as the data S0 and S1, through the AND gates 73 and 74 and the OR gates 80 and 81, thereby selecting one of the register select signals SRi (i=0, 1, 2, 3).

It is to be understood that the present invention may variously be changed and modified within the scope of the present invention. In the above-mentioned embodiment, the register file 11 is made up of the four registers R0-R3. The register select circuit 12 correspondingly contains the four level setting circuits 400-403. It is evident that the number of those circuits may properly be increased or decreased, if necessary. The circuit arrangement of each of the level setting circuits 400-403 is not limited to that shown in FIG. 3. The level setting circuit may have any arrangement if it can store the past interchange state of the select signal, and when the select data is supplied, can set a new level of the select signal depending on the select data and the memory state.

What is claimed is:

1. A memory device with a register interchange function, comprising:
    a register file having a plurality of registers each of which is selectable responsive to respective select signals; and
    a register selecting circuit for generating said select signals having a register select mode and a select signal interchange mode, the register selecting circuit including:
    means for decoding register select data during the register select mode and decoding register interchange data during the select signal interchange mode by producing signals with levels complementary to those of the respective register select and register interchange data;
    first comparing means for comparing register interchange data of different registers in the select signal interchange mode;
    first memory means provided for each register having predetermined contents in an initial state and being responsive to results of the comparison effected by the first comparing means for changing the contents of said each register;
    second comparing means provided for each register which compares in the register select mode the signals from the decoder means and the contents in the first memory means and provides the result of the comparison to the corresponding register as a select signal, and which compares in the select signal interchange mode the contents in the first memory means with the signals from the decoder means;
    second memory means, provided for each of the registers, for storing the output of the second comparing means in the select signal interchange mode; and
    control means provided for each of the registers to update, in accordance with the data stored in the second memory means, the contents in the first memory means on the basis of the output of the first comparing means.

2. A memory device according to claim 1 wherein said first memory means includes a T-type flip-flop and the internal state of the flip-flop is updated in accordance with the result of the comparison by the first comparing means when a clock pulse is supplied to the flip-flop.

3. A memory device according to claim 1 wherein said second comparing means includes an exclusive OR gate.

4. A memory device according to claim 1 wherein said second memory means includes a D-type flip-flop which has a reset function and is of the set prior type.

5. A memory device according to claim 1 wherein said first comparing means includes an exclusive OR gate.

6. A memory device according to claim 1, wherein said control means includes an AND gate responsive to a timing pulse and the output from said second memory means, the output of which is supplied to said first memory means as a clock pulse.

* * * * *